United States Patent [19]

Lin

[11] Patent Number: 5,086,485
[45] Date of Patent: Feb. 4, 1992

[54] METHOD AND APPARATUS FOR DYNAMICALLY SETTING A BACKGROUND LEVEL

[75] Inventor: Ying-wei Lin, Penfield, N.Y.

[73] Assignee: Xerox Corporation, Stamford, Conn.

[21] Appl. No.: 599,831

[22] Filed: Oct. 19, 1990

[51] Int. Cl.$^5$ .................. G06K 9/38; G06K 9/34; H04N 1/40
[52] U.S. Cl. ............................... 382/51; 382/52; 382/9; 358/466
[58] Field of Search .............. 382/51, 18, 52, 9; 358/466, 464, 447; 355/68, 80, 115

[56] References Cited

U.S. PATENT DOCUMENTS 4,963,036 10/1990 Drisko et al. ............... 382/51

Primary Examiner—David K. Moore
Assistant Examiner—Michael Cammarata
Attorney, Agent, or Firm—Finnegan, Henderson, Farabow, Garrett & Dunner

[57] ABSTRACT

An apparatus for determining a background level of an image to be scanned. The apparatus builds a series of histograms of the image each corresponding to a line of the image, analyzes each of the histograms, and averages the results of the analysis, to continually update a background level during the scan of the image. The apparatus may be implemented with a simple architecture capable of operating at high speed.

9 Claims, 5 Drawing Sheets

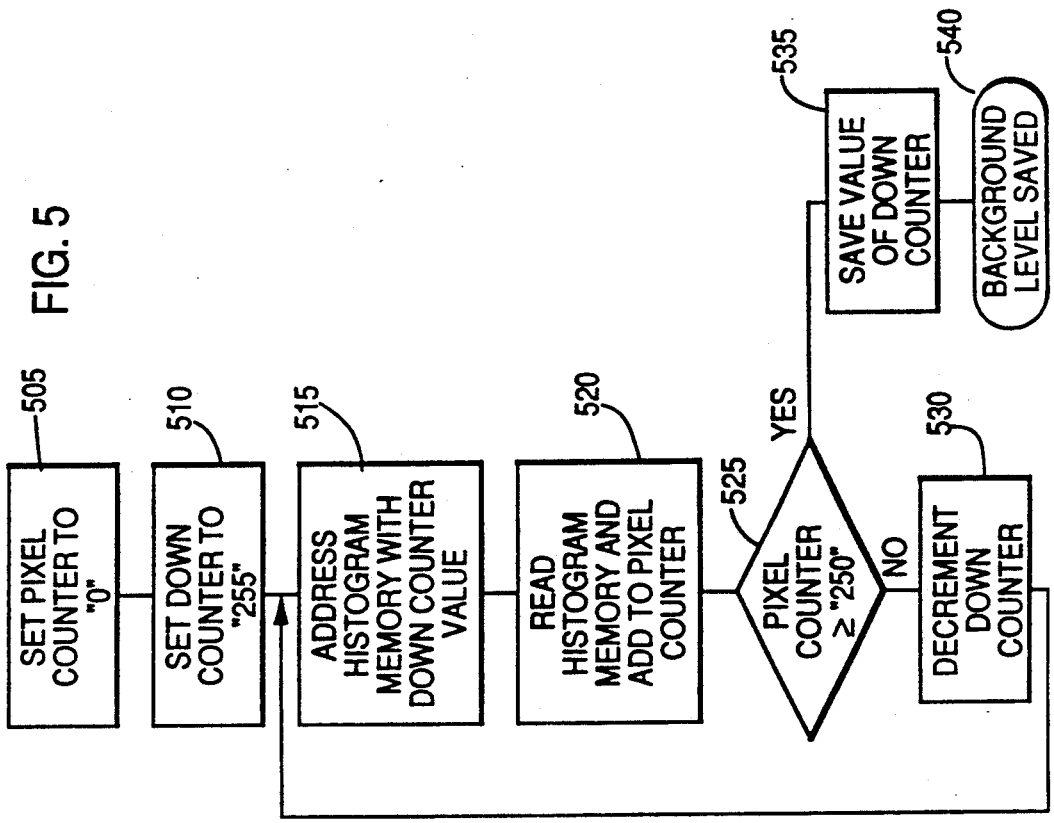
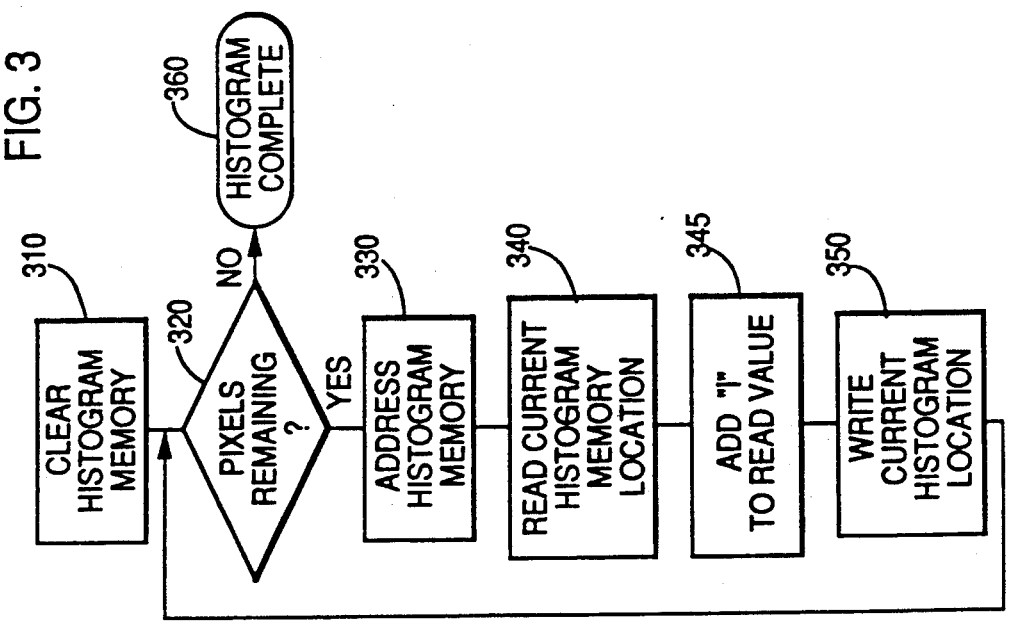

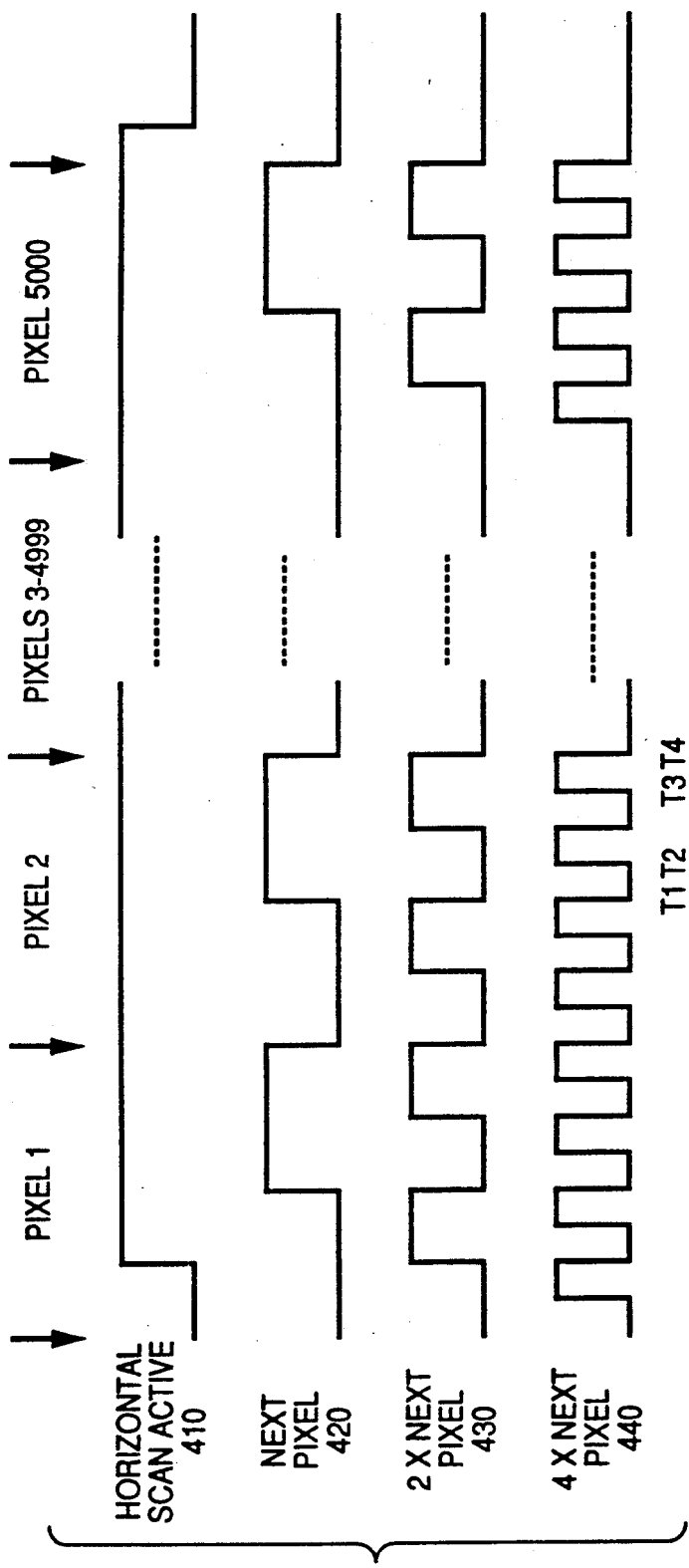

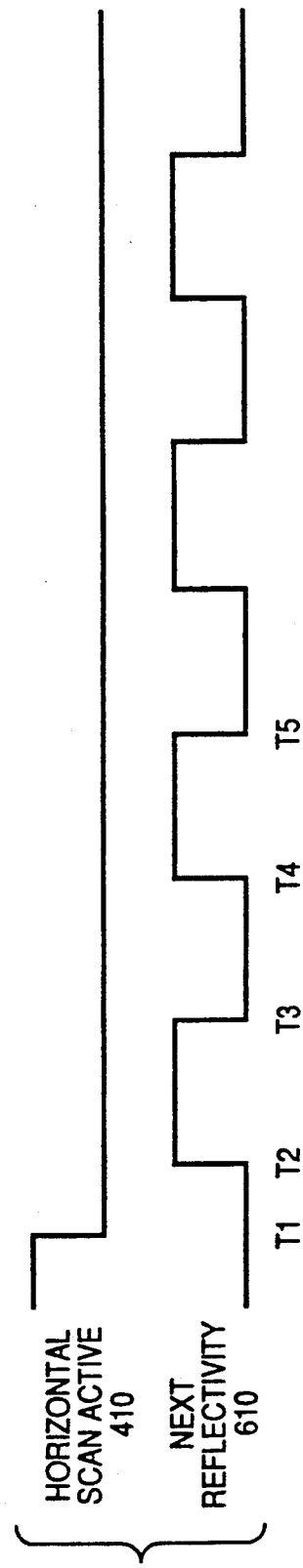

METHOD AND APPARATUS FOR DYNAMICALLY SETTING A BACKGROUND LEVEL

BACKGROUND OF THE INVENTION

1. Field of the Invention

This invention relates to a method and apparatus for automatically setting a background level in an imaging system, and more particularly to a method and apparatus for determining threshold levels in an image scanning system.

2. Description of Related Art

A typical image scanner partitions an image of, for example, a sheet of paper into multiple areas called pixels. When the sheet of paper is illuminated, each pixel will have a reflectivity value falling within a continuous range from the darkest pixel reflectivity value to the lightest pixel reflectivity value. The image scanner then quantizes each value from the range of continuous values into one of a set of discrete values. The quantization process requires a set of threshold values to determine which continuous values correspond to a certain discrete value. The optimum set of thresholds is a function of the nature of the image being scanned including, for example, the background color of the paper.

Since it is desirable that a particular image scanner be capable of scanning images from a variety of types of sources, the threshold levels are designed to vary. Many image scanners have manual controls allowing the operator to vary the threshold levels; but this arrangement by itself is an unsatisfactory solution to the problem of setting threshold levels because manual intervention makes the machine more difficult to use. Thus, a number of methods have been proposed to automatically determine a background level from which a set of thresholds may be determined. One method involves averaging reflectivity values in a selected area near the beginning of a document to be scanned. The problem with this method is that the selected area may not be representative of the document and may instead be a border decoration area, for example.

Another method involves setting the background level based on the average pixel reflectivity value in a scan line. The average pixel reflectivity value is an appropriate basis for background level, however, only when the image being scanned is one having a small number of lines, such as an engineering drawing. The documents in a typical office environment are not necessarily limited to those having a small number of lines.

Another method involves prescanning the document to detect the highest and lowest pixel reflectivity values and then selecting threshold levels to obtain maximum resolution. One problem with this method is that the highest reflectivity value detected in a scan line may be the result of noise and therefore an inappropriate basis for setting the background level. Another problem is the requirement of a prescan, which limits document throughput. Further, a prescan may be impractical for some scanning applications such as, for example, applications employing a constant velocity transport system.

One method put into commercial use involves the construction of a histogram during a prescan of the image to be scanned. A histogram may be visualized as a graph, such as the one shown in FIG. 1, having reflectivity on the horizontal axis and the number of pixels having a certain reflectivity on the vertical axis. The 7650 ProImager scanner, manufactured by Xerox Corporation, constructs a histogram by prescanning the image to be scanned. The histogram is then analyzed to determine the highest pixel reflectivity value by starting with the right most nonzero point on the horizontal axis of the histogram and counting the number of pixels. Pixels in the histogram are continually counted while moving left on the horizontal axis until the number of pixels counted is equal to 5% of the total number of pixels in a scan line. The reflectivity value where this occurs is taken to be the background level. The lowest reflectivity value is determined in an analogous fashion by starting at the left most nonzero point on the horizontal axis and moving right. These highest and lowest reflectivity values are used to construct a mapping function that maps a video signal onto the interval from 0 to 255, and the mapped video signal is then thresholded or screened normally. This method produces high and low background values that tend to be independent of noise, but the method has the disadvantage of requiring a prescan of the document to be scanned.

A method not requiring a prescan is disclosed in U.S. Pat. No. 4,850,029 to Moyer filed July 15, 1985. This method involves the running calculation of a number of different types of averages that are constantly updated to produce a value indicative of the average pixel value of a document. Moyer, however, is directed to determining an average white value and using this average white value only to calculate a threshold value. Although an average white value might be used to estimate a threshold value, it may not be suitable for more general applications, such as mapping of pixel reflectivity values. Further, Moyer involves a relatively complicated algorithm that is preferably implemented with a microprocessor. Although the speed limitation incurred by using a microprocessor might be acceptable for some applications, for others it would not be acceptable. For example, in many scanners the data rate exceeds 10 million pixels per second, which would be a difficult for a microprocessor to achieve while running the Moyer algorithm. Moyer discloses a technique of skipping pixels to increase document throughput, but skipping pixels can lead to drastic inaccuracies in threshold calculation, particularly on documents with periodic structures. Additional speed might be gained by implementing the algorithm of Moyer on a special purpose chip, but that would involve additional hardware expense.

OBJECTS AND SUMMARY OF THE INVENTION

It is an object of the invention to reliably determine a background level of an image to be scanned that is relatively unaffected by noise in the image.

It is a further object of the invention to determine a background level without a prescan.

It is yet another object of the invention to determine a background level at high speed while using relatively inexpensive hardware.

To achieve these and other objects of the invention, in an image scanning system for producing a digital image from an analog image, a method of dynamically adjusting a background level, comprises the steps of: scanning the reflectivity of a plurality of pixels across a line of the analog image; quantizing, in response to the scanning step, the reflectivity of each pixel to produce one of a finite set of reflectivity values; recording, in response to the scanning step, the number of pixels having each reflectivity value; subsequently, summing, in response to the recording step, the number of pixels having each reflectivity value, starting with the highest value, continually moving to a lower adjacent value, and stopping at a final reflectivity value when the number of pixels is equal to a predetermined fraction of the number of pixels in a line; and setting a background value based on the final reflectivity value and the final reflectivity values from previous lines.

According to another aspect of the invention, in an image scanning system for producing a digital image from an analog image, an apparatus for dynamically adjusting a background level, comprises: means for scanning the reflectivity of a plurality of pixels across a line of the analog image; means, coupled to the scanning means, for quantizing the reflectivity of each pixel to produce one of a finite set of reflectivity values; means, coupled to the scanning means, for recording the number of pixels having each reflectivity value; means, coupled to the recording means, for summing the number of pixels having each reflectivity value, starting with the highest value, continually moving to a lower adjacent value, and stopping at a final reflectivity value when the number of pixels is equal to a predetermined fraction of the number of pixels in a line; and means, coupled to the summing means, for setting a background value based on the final reflectivity value and on final reflectivity values from previous lines.

BRIEF DESCRIPTION OF DRAWINGS

FIG. 3 is a flow chart illustrating the building of a histogram during a horizontal scan of the image being scanned according to a preferred embodiment of the invention.

FIG. 4 is a timing diagram corresponding to FIG. 3 showing control signals for the apparatus of FIG. 2.

FIG. 5 is a flow chart showing the analysis of the histogram after a horizontal scan according to a preferred embodiment of the invention.

FIG. 6 is a timing diagram corresponding to FIG. 5 showing control signals for the apparatus of FIG. 2.

DETAILED DESCRIPTION OF THE PREFERRED EMBODIMENTS

Figure 2:
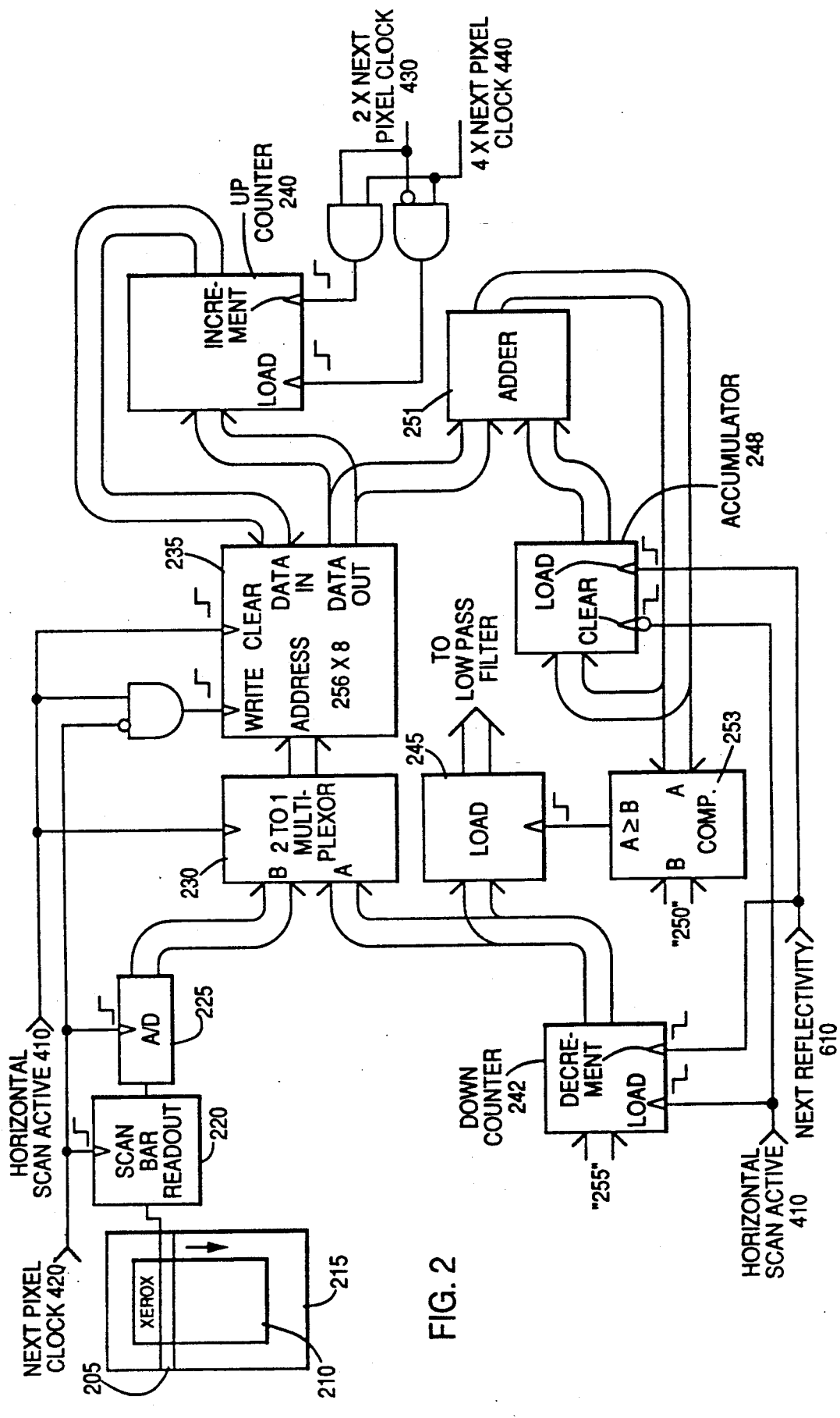
FIG. 2 is an overview of data flow in an apparatus according to a preferred embodiment of the invention.

FIG. 2 shows an overview of data flow in an apparatus for generating a background level, which constitutes a part of an image scanning system. Scan bar sensor 205 moves across the face of an image to be scanned such as sheet of paper 210, which is mounted on platen 215. Scan bar sensor 205 is composed of multiple light detecting elements mounted along the axis of the sensor. During the course of scanning sheet of paper 210 scan bar sensor 205 moves down the sheet of paper by way of mechanical means (not shown). When scan bar sensor 205 moves to a new horizontal position, scan bar readout circuit 220 reads each light detecting element in scan bar sensor 205 during the course of a horizontal scan. Scan bar sensor 220 presents a series of analog values to analog to digital converter 225, each analog value corresponding to the reflectivity sensed by one of the light detecting elements in scan bar sensor 205. During the course of a horizontal scan, a multiplexer 230 steers its' B input value to its output, which is coupled to the address of a histogram memory 235.

It is presently preferred that histogram memory 235 be a random access memory having a reset line that can be clocked to clear all memory locations. The data output of histogram memory 235 is connected to an upcounter 240 and the output of upcounter 240 is coupled back to the data input of histogram memory 235. The elements just described, 205-240, build a histogram when controlled by control logic (not shown) of the current horizontal line.

Figure 1:
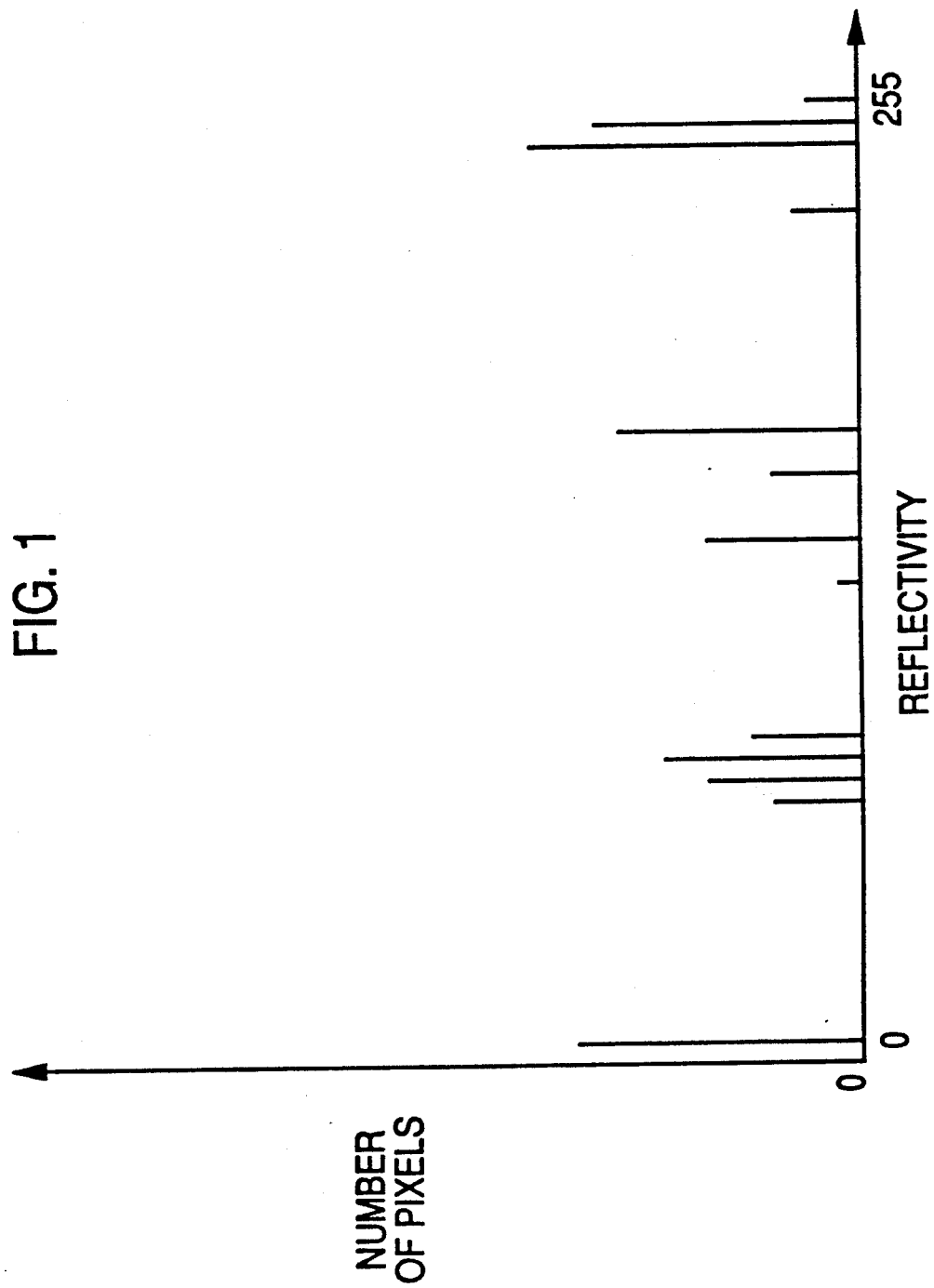
FIG. 1 is a graph illustrating a histogram.

As described earlier, in the BACKGROUND OF THE INVENTION, a histogram may be visualized as a graph, such as the one shown in FIG. 1, having reflectivity on the horizontal axis and the number of pixels having a certain reflectivity on the vertical axis. Briefly, the histogram building process of the preferred embodiment involves performing a scan of the reflectivity of the pixels across a line of an image to be scanned, converting the results of the scan from analog to digital form, and digitally recording the number of pixels having each reflectivity value.

Multiplexer 230 and histogram memory 235 together with the elements shown in the lower half of FIG. 2, when controlled by control logic, analyze the histogram after the histogram is constructed at the end of a horizontal scan. A downcounter 242 can be loaded with the highest pixel reflectivity value, which is "255" in the preferred embodiment. The output of downcounter 242 is coupled to multiplexer 230 that, when the histogram is being analyzed, steers its A input value to its output, which is coupled to the address input of histogram memory 235. The output of downcounter 242 is also connected to the input of a latch 245, which will latch the final result of analyzing the histogram. An accumulator 248 together with an adder 251 sum the number of pixels having a certain reflectivity. When the total number reaches 250, 5% of the total of 5000 pixels in the horizontal scan of the preferred embodiment, a comparator 253 generates an output signal value causing latch 245 to latch the final results.

Although FIG. 2 is illustrative of the data flow in an apparatus according to the preferred embodiment, FIG. 2 is not necessarily illustrative of the preferred circuit topology. For example, although histogram memory 235 shows separate data-in and data-out paths, a typical random access memory chip might have data-in and data-out paths time multiplexed on common network nodes. Digital components 230-253 are preferably implemented in an application specific integrated circuit (ASIC).

FIG. 3 outlines the control flow for building a histogram according to a preferred embodiment of the invention. Before analyzing begins, the horizontal scan histogram memory 235 is cleared (step 310). In the preferred embodiment this is accomplished by clocking a reset line on histogram memory 235. Alternatively, if the histogram memory had no reset line, logic could be invoked to hold the data input of the histogram memory low while cycling through all addresses and clocking the write control line of the histogram memory. Next, it is determined if any pixels remain to be analyzed (step 320). If a pixel remains to be analyzed the output from scan bar readout circuitry 220 is converted to a digital value and used to address histogram memory 235 (step 330). The value addressed is transferred into upcounter 240 (step 340) and upcounter 240 is clocked to increment its count value by one (step 345). After the outputs of upcounter 240 have settled, a write pulse is supplied to histogram memory 235 (step 350). This process continues for all pixels until it is determined that there are no pixels remaining in the scan line (step 320), indicating that the histogram is complete (step 360).

Timing that could be used to build the histogram as outlined in FIG. 3 will now be described. FIG. 4 shows timing signals that could be used to accomplish the control flow as described in the text accompanying FIG. 3. FIG. 4 shows a horizontal scan active 410 signal designating that a horizontal scan is in progress, a next pixel 420 clock whose frequency is equal to the frequency of pixel readout from scan bar readout circuitry 220, a 2× next pixel 430 clock synchronized with next pixel 420 whose frequency is twice that of next pixel 420, and a 4× next pixel 440 clock synchronized with next pixel 420 whose frequency is four times that of next pixel 420.

Horizontal scan active 410 is generated by circuitry that determines whether there are pixels remaining to be processed on the current scan line (see step 320 in FIG. 3). A histogram is being constructed when horizontal scan active clock 410 is high. An example of processing of the second pixel read from scan bar sensor 205 will now be described. At a time T1, shown in FIG. 4, next pixel clock 420 goes high causing scan bar readout circuitry 220 to supply an analog reflectivity value corresponding to the second pixel to analog to digital convertor 225, which converts the analog reflectivity value to a digital value that is then supplied to the B input of multiplexer 230. Because the horizontal active clock 410 is connected to the control input of multiplexer 230, the output of the analog to digital converter is steered to addresses histogram memory 235 (see step 330 in FIG. 3). Next, at a time T2 shown in FIG. 4, the load control input of upcounter 240 is clocked so that the current pixel count for the reflectivity value of pixel 2 is loaded into upcounter 240 (see step 340 in FIG. 3). At a time T3, the increment control input of upcounter 240 is clocked so that the loaded value is incremented by 1 (see step 345 in FIG. 3). Finally, at a time T4 the write control input of histogram memory 235 is clocked so that the new pixel count for the reflectivity value of pixel 2 is written into histogram memory 235. Similar processing occurs for each of the 5,000 pixels in a scan line, after which time horizontal scan active clock 410 goes low.

FIG. 5 outlines the control flow for analyzing the histogram built, as described above, and for producing a value from which a background level can be calculated. A pixel counter is set to "0" (step 505) and a downcounter is set to the highest reflectivity value, "255," (step 510). The histogram memory is addressed with the downcounter (step 515), and the number of pixels having the reflectivity value of the downcounter is added to the pixel counter (step 520). Next, the pixel counter is checked to determine whether the total pixels counted so far is greater than or equal to "250," 5% of the 5000 pixels in a scan line (step 525). If the pixel counter is less than "250," the next left most point in the histogram is addressed by decrementing the downcounter (step 530). This process continues until step 525 determines that the pixel counter is greater than or equal to "250," in which case the current value of the downcounter is saved as the background level (step 535).

FIG. 6 shows timing that could be used to accomplish the control flow as outlined in the text accompanying FIG. 5. At a time T1 occurring after the end of a horizontal scan, horizontal scan active 410 signal goes low, setting downcounter 242 to "255" and accumulator 248 to "0" (see step 505-510 in FIG. 5). Because horizontal active clock 410 is low, multiplexer 230 will steer the output value of downcounter 242 to the address input of histogram memory 235 (see step 515 in FIG. 5). At a time T2 when next reflectivity 610 clock goes high, accumulator 248 is loaded with the sum of the current accumulator value ("0") and the data output of histogram memory 235 (see step 520 in FIG. 5). At a time T3, next reflectivity 610 clock goes low, decrementing downcounter 242 by one to a value of "254" (see step 530 in FIG. 5). "254" will be steered through multiplexer 230 to address histogram memory 235 and, at a time T4, accumulator 248 will clock in the sum of the old accumulator value (number of pixels having reflectivity "255") and the value at the current histogram memory address (number of pixels having reflectivity "254") (see steps 515-520 in FIG. 5). Comparator 253 compares the constant "250," 5% of the total of 5,000 pixels in a horizontal scan, with the output of adder 251 (see step 525 in FIG. 5). When the number of pixels summed from the histogram memory is greater than or equal to "250" comparator 253 clocks the load control input of latch 245 to latch the background reflectivity value (see steps 525-535 in FIG. 5).

The output of latch 245 is coupled to a low pass filter that averages background reflectivity values over a number of scan lines to eliminate fluctuations caused by dark lines running parallel to scan bar sensor 205, etc. A recursive digital low pass infinite inpulse response (IIR) filter (not shown) is preferred. The advantage of an IIR filter as opposed to, for example, an finite impulse response (FIR) filter, is that it can give better frequency response with fewer calculations, as the nonlinearity of phase response in the IIR filter is not important in this application. The cut off frequency of the filter can be adjusted such that averaging effectively takes place over approximately 50 horizontal scan lines (approximately 1/6 of an inch in a 300 spot per inch system), with recent values weighted most heavily.

Because the background level is continuously adjusted, a black border decoration area at the top of a page will have an effect for only a short distance. To further reduce the effect of such a border area, a check could be performed to disregard background level values less than a certain minimum.

The low pass filter can be constructed with standard hardware including a multiplier and a digital delay. A simple filter could be expressed as $$A_i = A_{i-1} + \alpha(B_i - A_{i-1}),$$

where $A_i$ is the current average value, $A_{i-1}$ is the previous average value, $B_i$ is the current background reflectivity value as described earlier, and $\alpha$ is a coefficient that determines the frequency response of the filter. Higher order filters, having more coefficients, can be constructed to achieve a sharper cutoff at the expense of more complex hardware.

The output of the low pass filter is a continuously varying background estimate. This background estimate can be used for the adjustment of a threshold value, or a set of values, for quantization of image data as required by electronic screening methods, for example. It can also be used to construct a linear mapping function to improve image contrast, for example. Other applications include character recognition improvement and text detection as part of an image segmentation method.

Thus, the apparatus for setting the background level according to the preferred embodiment does not require a prescan and can be implemented with relatively fast, inexpensive hardware.

Additional advantages and modifications will occur to those skilled in the art. The invention in its broader aspects is therefore not limited to the specific details, representative system and illustrative examples shown and described. Accordingly departures and optimizations may be made from such details without departing from the spirit or the scope of applicants general inventive concept. For example, one could take advantage of the fact that the background reflectivity estimate occurs after 5% of the total number of pixels in a scan line are processed. This means that no histogram location need store at more than 5%, 250, pixels. Thus, the word size of histogram memory 253 need only be 8 bits, provided the histogram building process contains logic to prevent the overflow of a count of "255" to "0."

Further, instead of much of the logic shown in FIG. 2, a microprocessor could be employed, provided that the application does not require higher throughput than can be obtained by using a microprocessor.

Thus, it will be further apparent to those skilled in the art that various modifications and variations can be made to the instant invention without departing from the scope or spirit of the invention and it is intended that the present invention cover modifications and variations provided they come within the scope of the appended claims and their equivalents.

What is claimed is:

1. In an image scanning system for producing a digital image from an analog image, a method of dynamically adjusting a background level, comprising the steps of:
    scanning the reflectivity of a plurality of pixels across a line of the analog image;
    quantizing, in response to the scanning step, the reflectivity of each pixel to produce one of a finite set of reflectivity values;
    recording, in response to the scanning step, the number of pixels having each reflectivity value;
    subsequently, summing, in response to the recording step, the number of pixels having each reflectivity value, starting with the highest value, continually moving to a lower adjacent value, and stopping at a final reflectivity value when the number of pixels is equal to a predetermined fraction of the number of pixels in a line; and
    setting a background value based on the final reflectivity value and the final reflectivity values from previous lines.

2. The method of claim 1, wherein the predetermined fraction is 0.05.

3. The method of either of claims 1 or 2, wherein the step of setting a background value includes the substep of
    averaging the final reflectivity values from previous scan lines.

4. The method of claim 3, wherein the substep of averaging includes the substep of
    passing the final reflectivity value to a low pass filter.

5. In an image scanning system for producing a digital image from an analog image, an apparatus for dynamically adjusting a background level, comprising:
    means for scanning the reflectivity of a plurality of pixels across a line of the analog image;
    means, coupled to the scanning means, for quantizing the reflectivity of each pixel to produce one of a finite set of reflectivity values;
    means, coupled to the scanning means, for recording the number of pixels having each reflectivity value;
    means, coupled to the recording means, for summing the number of pixels having each reflectivity value, starting with the highest value, continually moving to a lower adjacent value, and stopping at a final reflectivity value when the number of pixels is equal to a predetermined fraction of the number of pixels in a line; and
    means, coupled to the summing means, for setting a background value based on the final reflectivity value and on final reflectivity values from previous lines.

6. In an image scanning system for producing a digital image from an analog image, an apparatus for producing a valve useful for dynamically adjusting a background level, comprising:
    means for scanning a reflectivity of a plurality of pixels across a line of the analog image;
    quantizing means, coupled to the scanning means, for quantizing the reflectivity of each pixel to produce one of a finite set of digital reflectivity values;
    multiplexor means having a first data input coupled to the quantizing means, a second data input, a control input, and an output;
    incrementing means for incrementing a digital value by one, having an input port and an output port;
    histogram storing means having an address input coupled to the output of the multiplexor means, a data output coupled to the input of the incrementing means, and a data input coupled to the output of the incrementing means;
    means, coupled to the histogram storing means, for summing the number of pixels having each reflectivity value, starting with the highest value including
    means, coupled to the second data input of the multiplexor means, for counting down,
    accumulator means having an input and an output, and
    adder means having a first input coupled to the output of the histogram storing means, a second input coupled to the output of the accumulator, and an output coupled to the input of the accumulator;
    comparator means, coupled to the adder means, for comparing the output of the adder means to a predetermined fraction of the number of pixels in a scan line and for generating an output signal when the output of the adder means exceeds the predetermined fraction of the number of pixels in the scan line; and
    latch means for latching the value useful for dynamically adjusting the background level, including a data input coupled to the means for counting down, a control input responsive to the output signal generated by the comparator means, and an output.

7. An apparatus according to claim 6, wherein the comparator means further includes
    means for comparing the output of the adder means to 0.05 of the number of pixels in a scan line.

8. The apparatus of either of claims 6 or 7, further including
    averaging means, coupled to the output of the latch means, for averaging a latched reflectivity value with reflectivity values from previous lines.

9. The apparatus of claim 8, wherein the averaging means includes
    low pass filter means coupled to the output of the latch means.

* * * * *